(12) United States Patent
Liu et al.

(10) Patent No.: US 10,602,032 B2
(45) Date of Patent: Mar. 24, 2020

(54) METHOD OF CORRECTING IMAGE DISTORTION OF OPTICAL DEVICE IN DISPLAY DEVICE AND DISPLAY DEVICE

(71) Applicant: BOE TECHNOLOGY GROUP CO., LTD., Beijing (CN)

(72) Inventors: Xiangyang Liu, Beijing (CN); Naifu Wu, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 51 days.

(21) Appl. No.: 16/107,188

(22) Filed: Aug. 21, 2018

(65) Prior Publication Data

US 2019/0306383 A1 Oct. 3, 2019

(30) Foreign Application Priority Data

Mar. 30, 2018 (CN) .......................... 2018 1 0294620

(51) Int. Cl.
*H04N 5/217* (2011.01)
*G06T 5/00* (2006.01)

(52) U.S. Cl.
CPC ............. *H04N 5/217* (2013.01); *G06T 5/006* (2013.01)

(58) Field of Classification Search
CPC ................................ H04N 5/217; G06T 5/006
USPC ......................................................... 345/647
See application file for complete search history.

(56) References Cited

U.S. PATENT DOCUMENTS

| 10,388,001 | B2 * | 8/2019 | Kim ...................... G06T 3/0018 |
| 2002/0131095 | A1 * | 9/2002 | Koike .................... G06T 5/006 |
| | | | 358/516 |
| 2015/0254818 | A1 * | 9/2015 | Li .......................... G06T 5/006 |
| | | | 382/275 |
| 2016/0180501 | A1 * | 6/2016 | Mallet .................. G06T 3/0018 |
| | | | 382/164 |
| 2016/0189352 | A1 * | 6/2016 | Slutsky ................. H04N 5/345 |
| | | | 382/275 |
| 2019/0102868 | A1 * | 4/2019 | Beric ..................... G06T 5/006 |

* cited by examiner

*Primary Examiner* — Hai Tao Sun
(74) *Attorney, Agent, or Firm* — Kinney & Lange, P.A.

(57) ABSTRACT

A method of correcting image distortion of an optical device in a display device and a display device are provided. The method includes: generating a plurality of pre-distorted images having different correcting values based on a same reference image; inputting each of the pre-distorted images into the optical device respectively to generate a plurality of display images in one-to-one correspondence to the plurality of pre-distorted images; comparing each of the display images with the reference image respectively, to obtain a display image having a distortion value smaller than a first threshold with respect to the reference image, and determining a correcting value of a pre-distorted image corresponding to this display image as a distortion value of the display device; and correcting the image distortion of the optical device depending on the distortion value of the optical device.

13 Claims, 6 Drawing Sheets

S100 acquiring a plurality of lookup tables, wherein each of the lookup tables stores coordinates (x, y) of each pixel in the pre-distorted image and coordinates ($x_0$, $y_0$) of a pixel in the reference image corresponding to the coordinates (x, y)     S101 traversing all the pixels in the pre-distorted image for each lookup table while replacing a pixel value at coordinate ($x_0$, $y_0$) in the reference image with a pixel value at coordinate (x, y) in the pre-distorted image, to obtain a plurality of pre-distorted images having different correcting values and a correcting value of each of the pre-distorted images     S102

Fig. 6

Rounding down the pixel coordinates ($x_0, y_0$) in the reference image to obtain ($x_1, y_1$)     S1011

Representing the pixel coordinates ($x_0, y_0$) in the reference image by ($x_1, y_1$) and four weight values     S1012

Fig. 7

METHOD OF CORRECTING IMAGE DISTORTION OF OPTICAL DEVICE IN DISPLAY DEVICE AND DISPLAY DEVICE

CROSS-REFERENCE TO RELATED APPLICATION

The present application claims the benefit of Chinese Patent Application No. 201810294620.9 filed on Mar. 30, 2018 in the State Intellectual Property Office of China, the whole disclosure of which is incorporated herein by reference.

BACKGROUND

The present disclosure relates to display technology, and more specifically, to a method for correcting image distortion of an optical device in a display device and a display device.

Display devices show images to the user through an optical device. These images can be distorted after passed through the optical device. This distortion generally includes barrel distortion, trapezoidal distortion, etc., which may adversely affect the image display. When the optical device has less influence on the distortion of the images, the distorted images have little effect on the user's visual experiences.

SUMMARY

An embodiment of the present disclosure provides a method of correcting an image distortion of an optical device in a display device, comprising: generating a plurality of pre-distorted images having different correcting values based on a same reference image; inputting each of the pre-distorted images into the optical device to generate a plurality of display images in one-to-one correspondence to the plurality of pre-distorted images; comparing each of the display images with the reference image, to obtain a display image having a distortion value smaller than a first threshold with respect to the reference image, and determining a correcting value of a pre-distorted image corresponding to this display image as a distortion value of the optical device; and correcting the image distortion of the optical device depending on the distortion value of the optical device.

In some embodiments, generating the plurality of pre-distorted images having different correcting values comprises: acquiring a plurality of lookup tables, wherein each of the lookup tables stores coordinates (x, y) of each pixel in the pre-distorted image and coordinates ($x_0$, $y_0$) of a pixel in the reference image corresponding to the coordinates (x, y); traversing all the pixels in the pre-distorted image for each lookup table while replacing a pixel value at coordinate ($x_0$, $y_0$) in the reference image with a pixel value at coordinate (x, y) in the pre-distorted image, to obtain a plurality of pre-distorted images having different correcting values and a correcting value of each of the pre-distorted images, wherein, each lookup table corresponds to a distortion correction parameter $k_1$, x is a horizontal ordinate of each pixel in the pre-distorted image to be generated, y is a vertical ordinate of each pixel in the pre-distorted image to be generated, $x_0$ is a horizontal ordinate of each pixel in the reference image, and $y_0$ is a vertical ordinate of each pixel in the reference image.

In some embodiments, for a barrel distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x_0 = x \cdot (k_1 \cdot r + 1)/(k_1 \cdot r_{max} + 1) \\ y_0 = y \cdot (k_1 \cdot r + 1)/(k_1 \cdot r_{max} + 1) \end{cases}$$

$$r = x^2 + y^2$$

$$r_{max} = (x_{max}^2 + y_{max}^2)/4$$

wherein x ranges from 0 to $x_{max}$, and $x_{max}$ is a maximum value of x, and y ranges from 0 to $y_{max}$, and $y_{max}$ is a maximum value of y.

In some embodiments, the correcting value of each of the pre-distorted images is a correcting value of a pixel that has the largest correcting value in the pre-distorted image.

In some embodiments, the method further comprises: calculating out coordinates ($x_0$, $y_0$) of pixels in the corresponding reference image based on the correspondence according to the coordinates (x, y) of pixels in the pre-distorted image; and performing a bilinear interpolation compensation on the coordinates ($x_0$, $y_0$) of a pixel in the reference image in response to the coordinates ($x_0$, $y_0$) being in a form of floating point numbers.

In some embodiments, for a trapezoidal distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x = \dfrac{x_0}{1 + k_1 y_0} \cdot (1 + k_1 y_{0max}) \\ y = y_0 \end{cases}$$

wherein $y_0$ ranges from 0 to $y_{0max}$, and $y_{0max}$ is the maximum value of $y_0$.

In some embodiments, the correcting value of each of the pre-distorted images is a correcting value of a pixel that has the largest correcting value in the pre-distorted image.

In some embodiments, the method further comprises: calculating out coordinates ($x_0$, $y_0$) of pixels in the corresponding reference image based on the correspondence according to the coordinates (x, y) of pixels in the pre-distorted image; and performing a bilinear interpolation compensation on the coordinates ($x_0$, $y_0$) of a pixel in the reference image in response to the coordinates ($x_0$, $y_0$) being in a form of floating point numbers.

In some embodiments, comparing each of the display images with the reference image, to obtain a display image having a distortion value smaller than a first threshold with respect to the reference image, and determining a correcting value of a pre-distorted image corresponding to this display image as a distortion value of the optical device comprises: determining a correcting value of the pre-distorted image corresponding to one display image that has a distortion value which is the smallest distortion value among the plurality of display images with respect to the reference image and less than the first threshold, as the distortion value of the optical device.

In some embodiments, correcting the image distortion of the optical device depending on the distortion value of the optical device comprises: in response to a distortion value of the optical device that is less than a second threshold, inputting an image to be input into the optical device directly into the optical device; in response to a distortion value of the optical device that is greater than or equal to the second threshold, applying a pre-distortion to the image to be input into the optical device so as to generate a pre-distorted image and inputting the pre-distorted image into the optical device, wherein a correcting value of the pre-distorted image is equal to the distortion value of the optical device.

In some embodiments, the first threshold is less than or equal to the second threshold.

Another embodiment of the present disclosure also provides a display device comprising: an optical device, a memory and a processor; wherein, the processor is configured to perform a first process for generating a plurality of pre-distorted images having different correcting values based on a same reference image; the optical device is configured to respectively generate a plurality of display images in one-to-one correspondence to the plurality of pre-distorted images based on the pre-distorted images; the processor is further configured to perform a second process for comparing each of the display images with the reference image, to obtain a display image having a distortion value smaller than a first threshold with respect to the reference image, and determine a correcting value of a pre-distorted image corresponding to this display image as a distortion value of the optical device, and configured to perform a third process for correcting the image distortion of the optical device depending on the distortion value of the optical device.

In some embodiments, the third process is configured to apply a pre-distortion to an image to be input into the optical device, in response to a distortion value of the optical device that is greater than or equal to a second threshold, to generate a pre-distorted image for display of the optical device, wherein the correcting value of the pre-distorted image is equal to the distortion value of the optical device.

In some embodiments, the memory is configured to store a plurality of lookup tables, and each of the lookup tables stores coordinates (x, y) of each pixel in the pre-distorted image to be generated and coordinates ($x_0$, $y_0$) of a pixel in the reference image corresponding to the coordinates (x, y) of each pixel in the pre-distorted image to be generated; wherein, each of the lookup tables corresponds to a distortion correction parameter $k_1$ and a correcting value of a corresponding pre-distorted image, x is a horizontal ordinate of each pixel in the pre-distorted image to be generated, y is a vertical ordinate of each pixel in the pre-distorted image to be generated, $x_0$ is a horizontal ordinate of each pixel in the reference image, and $y_0$ is a vertical ordinate of each pixel in the reference image.

In some embodiments, the first process is configured to obtain the plurality of lookup tables from the memory and traverse all the pixels in the pre-distorted image for each lookup table while replacing a pixel value at coordinates ($x_0$, $y_0$) of a pixel in the reference image with a pixel value at coordinates (x, y) of a pixel in the pre-distorted image, to obtain a plurality of pre-distorted images having different correcting values and a correcting value of each of the pre-distorted images.

In some embodiments, for a barrel distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x_0 = x \cdot (k_1 \cdot r + 1)/(k_1 \cdot r_{max} + 1) \\ y_0 = y \cdot (k_1 \cdot r + 1)/(k_1 \cdot r_{max} + 1) \end{cases}$$

-continued
$$r = x^2 + y^2$$
$$r_{max} = (x_{max}^2 + y_{max}^2)/4$$

wherein x ranges from 0 to $x_{max}$, and $x_{max}$ is a maximum value of x, and y ranges from 0 to $y_{max}$, and $y_{max}$ is a maximum value of y.

In some embodiments, the correcting value of each of the pre-distorted images is a correcting value of a pixel that has the largest correcting value in the pre-distorted image.

In some embodiments, for a trapezoidal distortion that the optical device applies to an input image, the correspondence between the coordinates (x, y) of the pixels in the pre-distorted image to be generated and the coordinates ($x_0$, $y_0$) of the pixels in the reference image is defined as:

$$\begin{cases} x = \dfrac{x_0}{1 + k_1 y_0} \cdot (1 + k_1 y_{0max}) \\ y = y_0 \end{cases}$$

wherein $y_0$ ranges from 0 to $y_{0max}$, and $y_{0max}$ is the maximum value of $y_0$.

In some embodiments, the correcting value of each of the pre-distorted images is a correcting value of a pixel that has the largest correcting value in the pre-distorted image.

In some embodiments, the second process is configured to determine a correcting value of the pre-distorted image corresponding to one display image that has a distortion value which is the smallest distortion value among the plurality of display images with respect to the reference image and less than the first threshold, as the distortion value of the optical device.

BRIEF DESCRIPTION OF THE DRAWINGS

The specific embodiments of the present disclosure will be further described in detail below with reference to the accompanying drawings.

FIG. 6 is a flow chart showing a specific example of step S100 in the method shown in FIG. 3.

FIG. 7 is a flow chart showing a specific example of bilinear interpolation compensation in step S101 in the method shown in FIG. 3.

DETAILED DESCRIPTION

Figure 1:
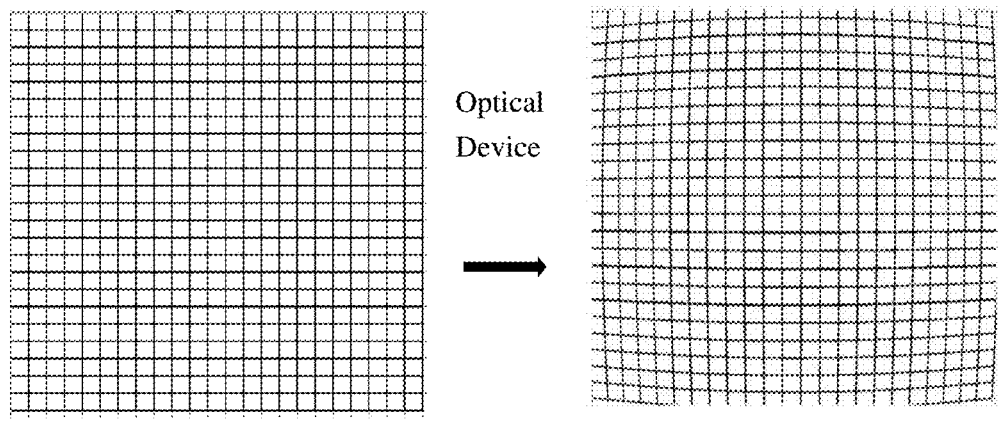
FIG. 1 is a schematic view showing a reference image being subjected to barrel distortion through an optical device.

In order to explain the present disclosure more clearly, it will be further described in conjunction with the exemplified embodiments and the accompanying drawings. Similar components in the drawings are indicated by the same reference numerals. Those skilled in the art should understand that the following detailed description is illustrative and not intended to limit the scope of the disclosure.

Figure 2:
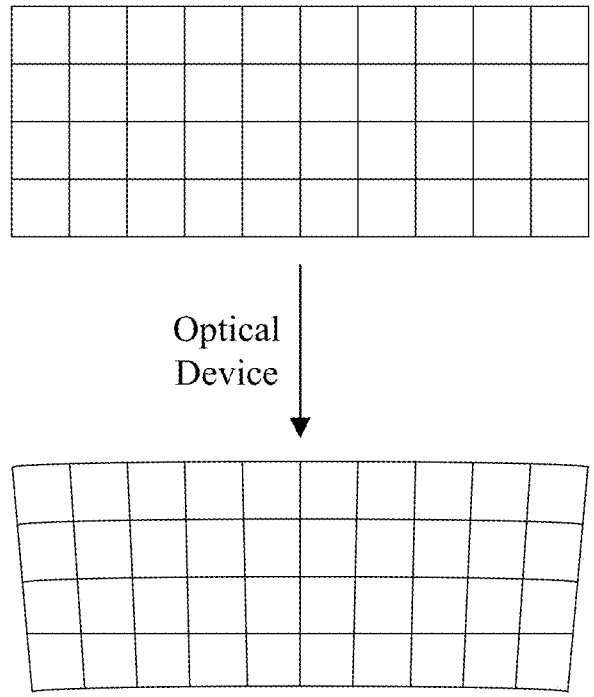
FIG. 2 is a schematic view showing a reference image being subjected to trapezoidal distortion through an optical device.

As shown in FIG. 1 and FIG. 2, display devices, such as AR (Augmented Reality) and HUD (Head Up Display), display images to the user through optical devices. A distortion, such as barrel distortion (for AR), trapezoidal distortion (for HUD), etc., would be generated in the images after they have passed through the optical device. If the distorted image is displayed to the user directly, the image would have a poor quality of display, so as to degrade the user's experiences. In the related art, the technical means that are usually employed includes applying a pre-distorted correction to an image before it is inputted into the optical device, or applying a distortion correction to the distorted image outputted from the optical device before it is displayed to the user. That is, a distortion correction module needs to be arranged in the system. When the distortion of the image having passed through the optical device is relatively small, the distorted image has little effect on the user's visual experiences. In this case, the distortion correction of all images having passed through the optical device may cause waste of resources and high cost.

Figure 3:
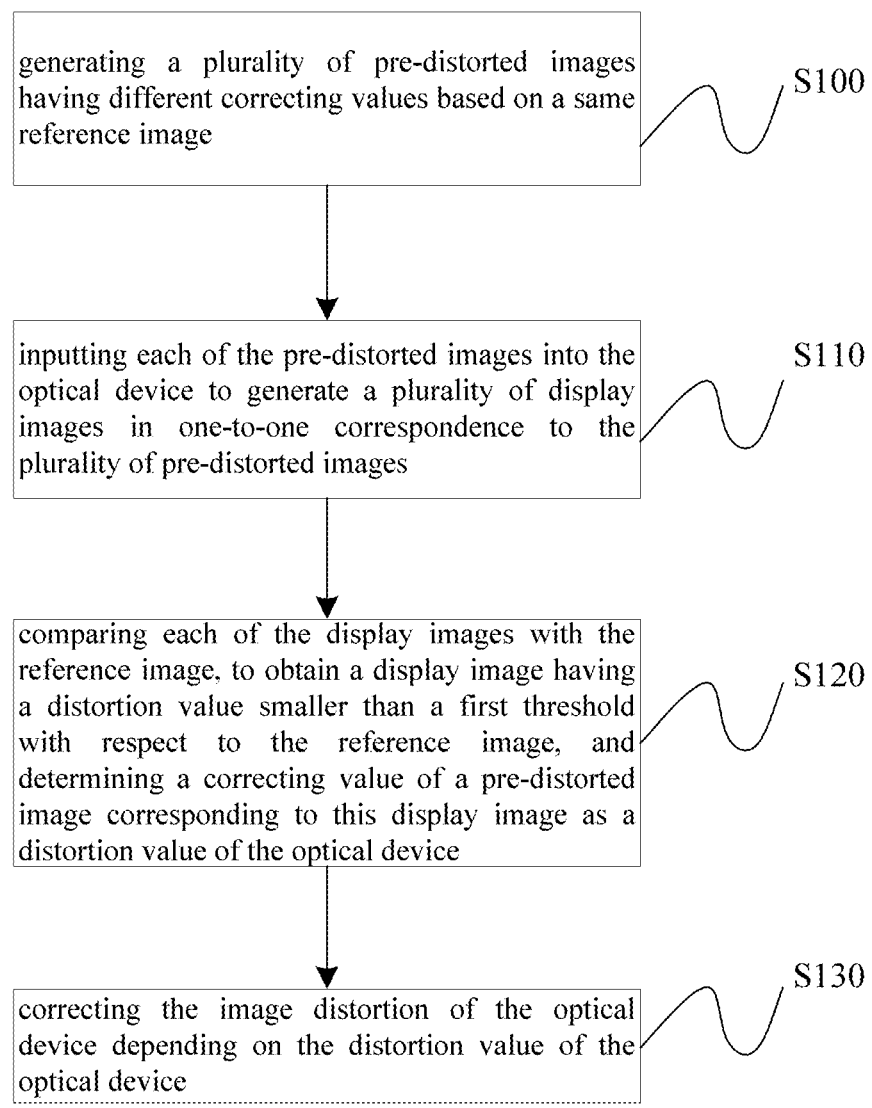
FIG. 3 illustrates a flow chart of a method of correcting image distortion of an optical device in a display device in accordance with an embodiment of the present disclosure.

As shown in FIG. 3, in accordance with an embodiment of the present disclosure, a method 10 of correcting image distortion of an optical device in a display device is provided. In the present embodiment, the method 10 includes:

Step S100: generating a plurality of pre-distorted images having different correcting values based on a same reference image. In practical applications, for the convenience of observation, a regular and well-arranged image such as a standard checkerboard image may be used as the reference image, as shown in FIG. 1 and FIG. 2. When a standard checkerboard image is used as the reference image, the distortion thereof is obvious and can be directly observed by the human eyes.

Specifically, as shown in FIG. 6, the step S100 may further include:

Step S101: Acquiring a plurality of lookup tables, wherein each of the lookup tables stores the coordinates (x, y) of each of the pixels in the pre-distorted image and the coordinates $(x_0, y_0)$ of the pixels in the reference image corresponding to the coordinates (x, y).

As an example, a lookup table may be a two-dimensional matrix, and the subscripts of each element in the two-dimensional matrix and the values stored in each element may respectively correspond to the coordinates of each pixel in the pre-distorted image to be generated and the coordinates of the pixels in the reference image corresponding to the coordinates of pixels in the pre-distorted image.

For example, in the case where a checkerboard image having a size of 1024*768 is used as the reference image, there are 768 rows and 1024 columns of 1024*768 pixels in the reference image, and the numbers of rows and columns of the two-dimensional matrix in the lookup table are also defined as 768 and 1024 respectively. There are 1024*768 elements in the lookup table. The position of each element in the two-dimensional matrix corresponds to the position of each pixel of the pre-distorted image to be generated. Each element stores the position coordinates of the pixel of the reference image corresponding to the pixel, represented by this element, of the pre-distorted image. For example, the element in the 384th row and the 10th column (384, 10) of the lookup table corresponds to the pixel in the 384th row and the 10th column (384, 10) of the pre-distorted image to be generated. Based on the correspondence between the pixels in the pre-distorted image and the pixels in the reference image, the pixel coordinates of the reference image corresponding to the pixel (384, 10) in the pre-distorted image can be determined as for example (384, 5), by calculation. Then data (384, 5) is stored at the element (384, 10) of the lookup table.

In an alternative embodiment, the positions of the plurality of elements in the lookup table in the two-dimensional matrix may also be in one-to-one correspondence to the positions of the pixels in the reference image. Each element stores the position coordinates of the pixel in the pre-distorted image corresponding to the pixels, represented by this element, of a reference image. Of course, for different types of display devices, the image sizes that can be transmitted are different. The present embodiment is merely illustrative and does not limit the scope of protection of the present disclosure.

In practical applications, the images transmitted by the AR display device and the HUD display device have different forms of distortion respectively. The AR display device applies a barrel distortion to the image, and the HUD display device applies a trapezoidal distortion to the image. Under different distortion conditions, the correspondence between the coordinates of pixels in the distorted image and the coordinates of the pixels in the reference image are different.

Specifically, when the optical device applies a barrel distortion to the input image, the correspondence between the coordinates (x, y) of the pixels in the pre-distorted image to be generated and the coordinates $(x_0, y_0)$ of the pixels in the reference image may be defined as:

$$\begin{cases} x_0 = x \cdot (k_1 \cdot r + 1)/(k_1 \cdot r_{max} + 1) \\ y_0 = y \cdot (k_1 \cdot r + 1)/(k_1 \cdot r_{max} + 1) \end{cases}$$
$$r = x^2 + y^2$$
$$r_{max} = (x_{max}^2 + y_{max}^2)/4$$

where each lookup table corresponds to a distortion correction parameter $k_1$, x is the horizontal ordinate of a pixel in the pre-distorted image to be generated, y is the vertical ordinate of a pixel in the pre-distorted image to be generated, $x_0$ is the horizontal ordinate of a pixel in the reference image, and $y_0$ is the vertical ordinate of a the pixel in the reference image. x ranges from 0 to $x_{max}$, and $x_{max}$ is the maximum value of x. y ranges from 0 to $y_{max}$, and $y_{max}$ is the maximum value of y.

When the optical device applies a trapezoidal distortion to the input image, the correspondence between the coordinates (x, y) of the pixels in the pre-distorted image to be generated and the coordinates $(x_0, y_0)$ of the pixels in the reference image may be defined as:

$$\begin{cases} x = \dfrac{x_0}{1 + k_1 y_0} \cdot (1 + k_1 y_{0max}) \\ y = y_0 \end{cases}$$

where $y_0$ ranges from 0 to $y_{0max}$ and $y_{0max}$ is the maximum value of $y_0$.

In an alternative embodiment, multiple lookup tables having different correcting values may be generated by selecting different distortion correction parameters $k_1$. Each of the lookup tables includes a plurality of elements in one-to-one correspondence to the coordinates (x, y) of pixels of the pre-distorted image to be generated. Each element stores the coordinates $(x_0, y_0)$ of the pixel in the reference image corresponding to the coordinates (x, y) of the pixel represented by this element.

Further, in step S101, one pixel in the pre-distorted image may be selected, and according to the coordinates (x, y) of the selected pixel, corresponding coordinates $(x_0, y_0)$ may be calculated out based on the correspondence described above. If the coordinates $(x_0, y_0)$ are in form of floating point numbers, they can be rounded down to be the coordinate of the pixel corresponding to the coordinates (x, y). Alternatively, the integer type coordinates adjacent to the coordinate $(x_0, y_0)$ may be taken as the coordinates of the pixel corresponding to the coordinates (x, y). Illustratively and alternatively, the coordinates $(x_0, y_0)$ may be subjected to a bilinear interpolation compensation so as to reduce the sawtooth of the pre-distorted image to be generated and thus improve the display effect.

As an example, as shown in FIG. 7, the step of applying the bilinear interpolation compensation may include:

Step S1011: rounding down $(x_0, y_0)$ to obtain $(x_1, y_1)$;

Step S1012: defining $(x_0, y_0)$ by $(x_1, y_1)$ and four weight values, where the four weight values are determined by the coordinates of the four integer type coordinates closest to the coordinates $(x_0, y_0)$, and the four weight values are defined as follows respectively:

$$\begin{cases} w_{lt} = (1 - x_0 + x_1) \cdot (1 - y_0 + y_1) \\ w_{lb} = (1 - x_0 + x_1) \cdot (y_0 - y_1) \\ w_{rt} = (x_0 - x_1) \cdot (1 - y_0 + y_1) \\ w_{rb} = (x_0 - x_1) \cdot (y_0 - y_1) \end{cases}$$

$w_{lt}$ is the weight value of $(x_1, y_1)$ with respect to $(x_0, y_0)$, $w_{lb}$ is the weight value of $(x_1, y_1)$ with respect to $(x_0+1, y_0)$, $w_{rt}$ is the weight of $(x_1, y_1)$ with respect to $(x_0, y_0+1)$, and $w_{rb}$ is the weight of $(x_1, y_1)$ with respect to $(x_0+1, y_0+1)$.

After performing a bilinear interpolation compensation on the coordinates $(x_0, y_0)$ in form of floating point numbers, the coordinates $(x_1, y_1)$ and the four weight values ($w_{lt}$, $w_{lb}$, $w_{rt}$, $w_{rb}$) are stored in the element corresponding to the coordinates $(x_0, y_0)$ in the lookup table, such that the position of the floating point type coordinates $(x_0, y_0)$ is indicated uniquely.

As shown in FIG. 6, the step S100 may further include:

Step S102: traversing all the pixels in the pre-distorted image for each lookup table while replacing the pixel value at the coordinates $(x_0, y_0)$ in the reference image with the pixel value at the coordinates (x, y) in the pre-distorted image, traversing all the pixels in the pre-distorted image according to the plurality of lookup tables to obtain a plurality of pre-distorted images having different correcting values and the correcting value of each pre-distorted image.

Figure 4:
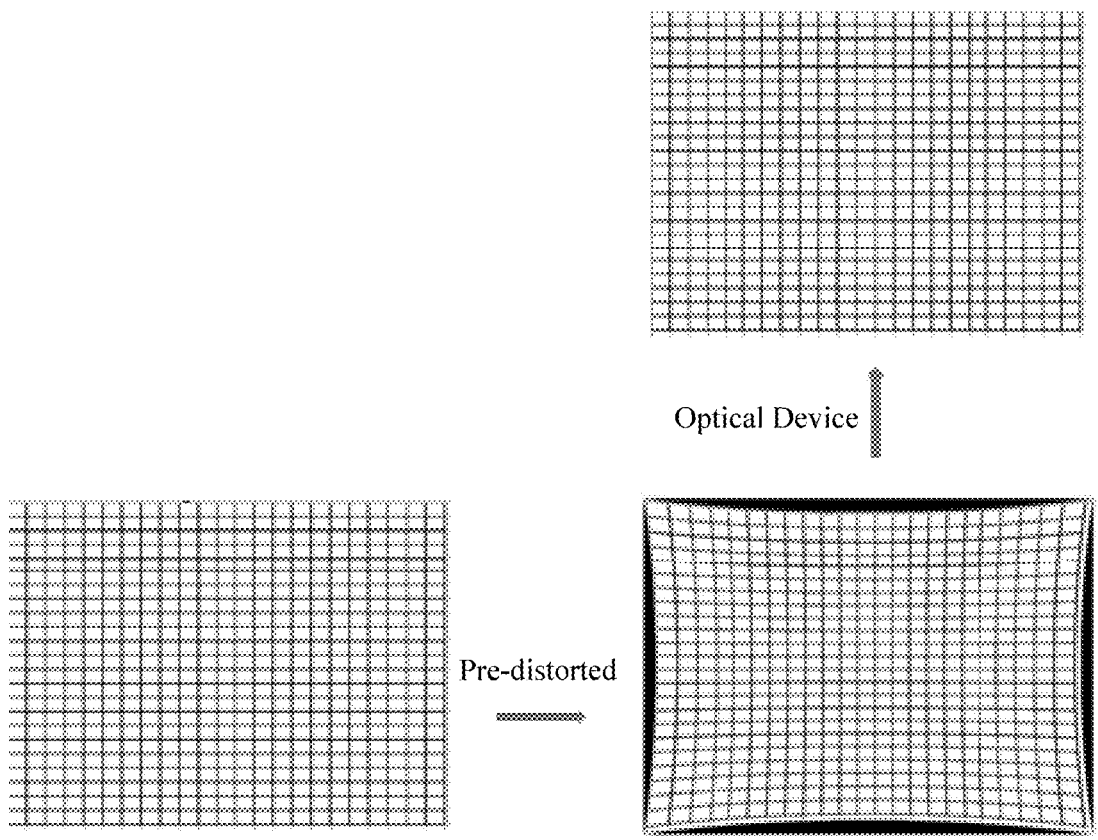
FIG. 4 is a schematic diagram showing determining a distortion value of an optical device for a barrel distortion according to an embodiment of the present disclosure.

When (x, y) is the coordinates of the pixel within an edge area of the pre-distorted image to be generated, the coordinates $(x_0, y_0)$ corresponding to the coordinates (x, y), obtained from the correspondence between $(x_0, y_0)$ and (x, y) may exceed the coordinate range of the reference image. As shown in FIG. 4, the edge region of the pre-distorted image does not correspond to any region of the reference image any longer. The region of the pre-distorted image that corresponds to the inappropriate coordinates $(x_0, y_0)$ beyond the coordinate range of the reference image may be filled with a uniform color. The color may comprise any color, such as black, as long as it may be distinguished from an edge of the distorted reference image.

In an alternative embodiment, the pre-distorted image is stored in a similar manner to the reference image. For example, when the pixel size of the reference image is 1024*768, a two-dimensional matrix of 1024*768 may be used to store the pixel values of all pixels of the reference image and the pre-distorted image to be generated.

A pixel value of a certain pixel of the pre-distorted image to be generated may be obtained through finding by a lookup table a corresponding position corresponding to this pixel in the reference image and finding the pixel value of the corresponding position by the two-dimensional matrix in which the reference image is stored. The pixel value is stored into the corresponding element in the two-dimensional matrix of the pre-distorted image. Each pixel in the pre-distorted image is traversed and the pixel value of each pixel is stored in sequence, and thus a pre-distorted image may be generated. Of course, in other embodiments, the reference image and the generated pre-distorted image may also adopt various storage modes such as vector storage. In various storage modes, the correspondence between the coordinates of each pixel of the reference image and coordinates of each pixel the pre-distorted image to be generated may be obtained by forming a lookup table. Furthermore, a plurality of pre-distorted images having different correcting values may be generated based on the reference image and the lookup table.

The reference image and the pre-distorted image may be a black and white image or a color image. In the case of a black and white image, the stored pixel value is a gray value. In the case of a color image, the stored pixel value is an RGB value.

In an alternative embodiment, in order to facilitate the measurement of the degree of the pre-distortion of the pre-distorted image, the correcting value of each pre-distorted image may be defined as the correcting value of the pixel having the maximum correcting value in the pre-distorted image.

That is, the correcting value may be obtained by the following formula:

$$p = \max\{|x - x_1|\}$$

where $x_1$ is obtained by rounding down the $x_0$. $x_0$ is the horizontal ordinate of the pixel of the reference image. x is the horizontal ordinate of the pixel of the pre-distorted image.

The method 10 of correcting an image distortion of an optical device in a display device may further include:

Step S110: inputting each of the pre-distorted images into the optical device to be displayed and generating a plurality of display images in one-to-one correspondence to the plurality of pre-distorted images.

Figure 5:
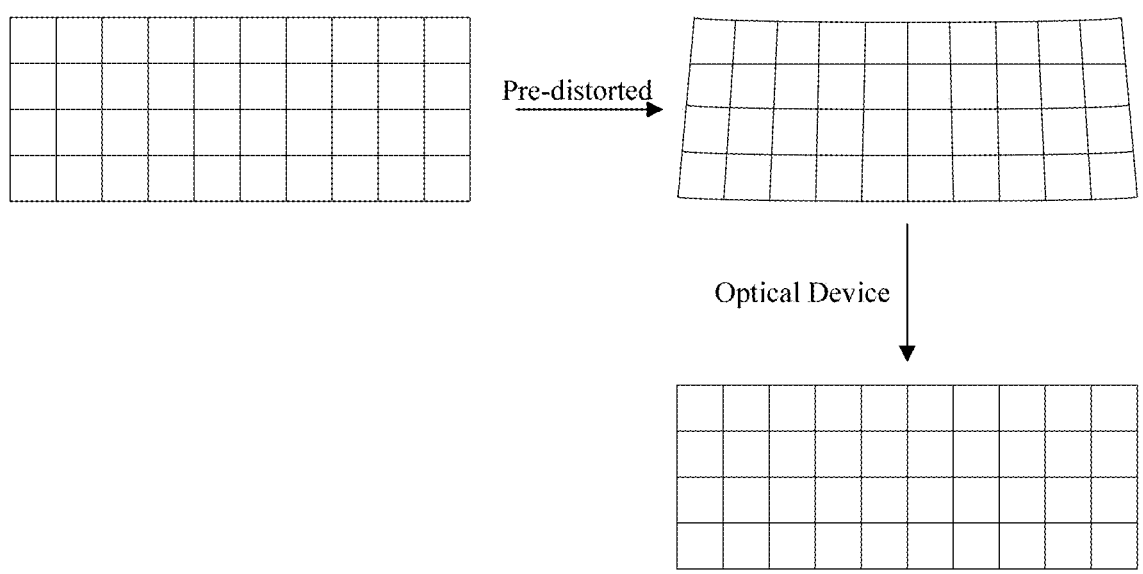
FIG. 5 is a schematic diagram showing determining a distortion value of an optical device for a trapezoidal distortion according to an embodiment of the present disclosure.

As shown in FIG. 4 and FIG. 5, after generating pre-distorted image with different correcting values based on a checkerboard image, the pre-distorted image has a pre-distortion with respect to the reference image. The pre-distortion has an opposite direction to that of the distortion caused by the optical device to the input image. Thus, after the pre-distorted image is inputted into the optical device, the distortion applied to the pre-distorted image has an opposite direction to the pre-distortion. When the correcting value of the pre-distortion is equal to the distortion value caused by the optical device, the distortion of the display image outputted by the optical device is eliminated.

The method 10 of correcting an image distortion of an optical device in a display device may further include:

Step S120: Comparing each of the display images with the reference image respectively, to obtain a display image whose distortion value with respect to the reference image is smaller than the first threshold, and the correcting value of the pre-distorted image corresponding to this display image is determined as the distortion value of the display device. Ideally, the first threshold is infinitely close to zero. In this case, the display image having a distortion value less than the first threshold with respect to the reference image is objectively identical to the reference image. However, in practice, the first threshold may take a number greater than zero, and the display image having a distortion value less than the first threshold with respect to the reference image may be considered to be consistent with the reference image. The first threshold may be determined by the tolerance of the distortion of the display image with respect to the reference image.

As an example, when the distortion of a display image with respect to the reference image is the smallest one of the distortions of all the display images with respect to the reference image and the distortion value is less than the first threshold, this image may be considered to be consistent with the reference image.

When judging whether a display image is consistent with the reference image, the display image outputted by the optical device may be visually observed by the operator directly and compared with the reference image. The operator may select a display image that is substantially same as the original reference image among a plurality of display images. The distortion value of this display image with respect to the reference image is considered as the smallest one of the distortion values of all the display images with respect to the reference image (while this distortion value is less than the first threshold). It is determined that the correcting value of the pre-distorted image corresponding to this display image is equal to the distortion value of the optical device.

In another embodiment, a plurality of display images corresponding to the plurality of pre-distorted images outputted by the optical device respectively may be collected by an image acquisition module, and the plurality of display images are compared with the original reference image respectively. If the distortion value of one of the display images is the smallest one of the distortions of the plurality of display images with respect to the reference image (while this distortion value is less than the first threshold), this display image is considered to be consistent with the reference image.

Figure 8:
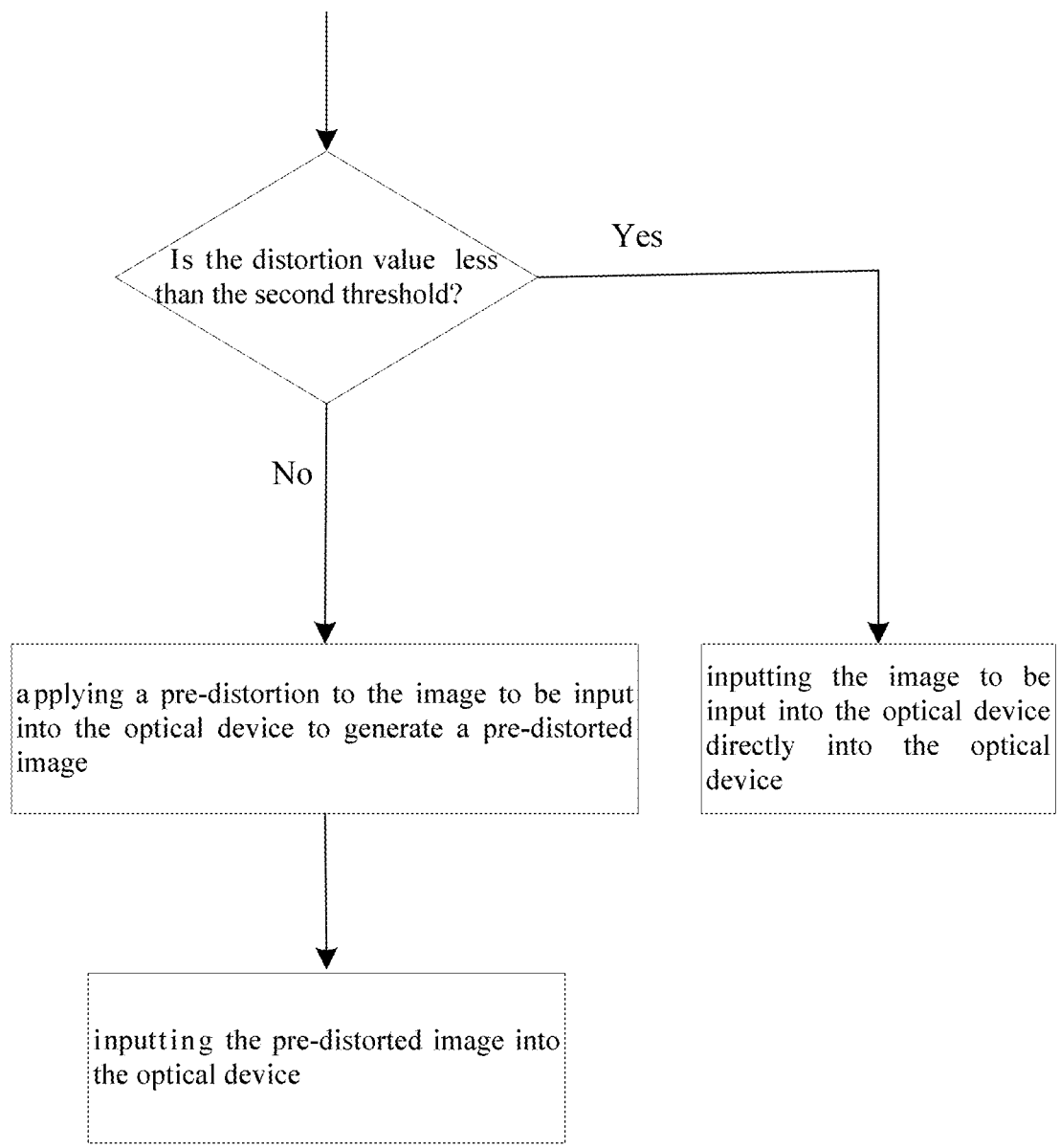
FIG. 8 is a flow chart showing a specific example of step S130 in the method shown in FIG. 3.
Figure 9:
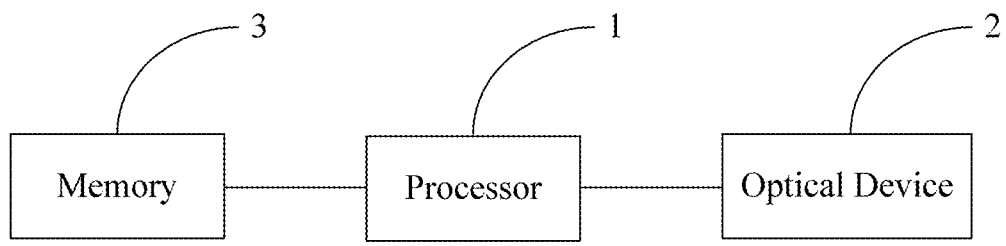
FIG. 9 is a schematic view showing the structure of a display device of an embodiment of the present disclosure.

The method 10 of correcting an image distortion of an optical device in a display device may further include:

Step S130: correcting the image distortion of the optical device depending on the distortion value of the optical device. As an example, as shown in FIG. 8, the step S130 may include:

Step S210: in the case where the distortion value of the optical device is less than the second threshold, the image to be inputted into the optical device is directly inputted into the optical device without performing pre-distortion correction; in the case where the distortion value of the optical device is greater than or equal to the second threshold, a pre-distortion is applied to the image to be inputted into the optical device so as to generate a pre-distorted image and input this pre-distorted image into the optical device. The correcting value of the pre-distorted image is equal to the distortion value of the optical device. As an example, the second threshold may be greater than or equal to the first threshold.

In an optional implementation manner, according to the size of the image, it may be arranged that when the distortion value of the image after having passed through the optical device is less than 3% of the image height, the optical device is considered to have less influence on the distortion of the input image and the user's visual experience would not be affected even if the distortion has been caused in the image by the optical device. For example, in the case where the pixel size of the input image is 1024*768, the second threshold may be preset to be 768*3%=23 rows of pixels. That is, in the case where the distortion value of the image after having passed through the optical system is less than 23 rows of pixels, the correction may not be performed to the optical device. Instead, the image is inputted into the optical device directly so as to save resources and reduce costs.

As shown in FIG. 6, according to another embodiment of the present disclosure, a display device is disclosed. In this embodiment, the display device includes a processor 1, an optical device 2, and a memory 3. The display device may be used to determine the image distortion value of the optical device 2 and/or correct the image distortion of the optical device 2. The display device may be a display device of the type of AR or HUD.

When the display device is used to determine the image distortion value of the optical device 2, the processor 1 is configured to perform a first process to generate a plurality of pre-distorted images having different correcting values based on a same reference image. When the display device is used to correct the distortion of the optical device 2, the processor 1 is configured to determine the distortion value of the optical device 2.

The optical device 2 is configured to respectively generate a plurality of display images in one-to-one correspondence to the plurality of pre-distorted images based on each of the pre-distorted images.

The processor 1 is further configured to perform a second process for comparing the plurality of display images outputted by the optical device with the reference image respectively, to obtain a display image whose distortion value with respect to the reference image is smaller than the first threshold, and the correcting value of the pre-distorted image corresponding to this display image is determined as the distortion value of the display device.

The processor 1 is further configured to perform a third process for correcting the image distortion of the optical device depending on the distortion value of the optical device.

By way of example, the third process is configured to apply a pre-distortion to the image to be inputted into the optical device, in response to the distortion value of the optical device that is greater than or equal to the second threshold, to generate a pre-distorted image for the display of the optical device. The correcting value of the pre-distorted image is equal to the distortion value of the optical device. When the distortion value of the optical device is less than the second threshold, the image to be inputted to the optical device is directly inputted into the optical device without performing the third process to apply a pre-distortion to the image to be inputted into the optical device.

In another embodiment, the display device may include only the processor 1 and the optical device 2. The lookup table may be stored in the cloud server by means of cloud storage. The plurality of lookup tables stored in the cloud server may be obtained through the communication with the cloud server. The way of storing the lookup table in the cloud server may also expand the number of lookup tables that are capable of being stored, avoiding the limitations of the hardware conditions of the device, and improving the accuracy of the obtained distortion value of the optical device 2.

In the embodiments of the present disclosure, based on a same reference image, a plurality of pre-distorted images having different correcting values are generated and inputted into the optical device. The optical device outputs a plurality of corresponding display images, to obtain a display image substantially the same as the reference image. The distortion value of the optical device is considered equal to the correcting value of the pre-distorted image corresponding to this display image, such that the image distortion value of the optical device is obtained. Depending on the obtained image distortion value of the optical device, it is further determined whether the image to be inputted into the optical device needs to be pre-distorted. When the optical device has less influence on the distortion of the input image, the correction may be omitted, improving the display efficiency, saving the resources and reducing the costs.

It is apparent that the above-described embodiments of the present disclosure are merely examples for describing the present disclosure clearly, and are not intended to limit the embodiments of the present disclosure. Other variations or modifications may be made by those skilled in the art based on the above description. It is to be understood that it is impossible to illustrate all the embodiments exhaustively and various changes and modifications may be made without departing from the scope of the present disclosure.

What is claimed is:

1. A method of correcting an image distortion of an optical device in a display device, the method comprising:
    generating a plurality of pre-distorted images having different correcting values based on a same reference image;
    inputting each of the pre-distorted images into the optical device to generate a plurality of display images in one-to-one correspondence to the plurality of pre-distorted images;
    comparing each of the display images with the reference image, to obtain a display image having a distortion value smaller than a first threshold with respect to the reference image, and determining a correcting value of a pre-distorted image corresponding to this display image as a distortion value of the optical device; and
    correcting the image distortion of the optical device depending on the distortion value of the optical device;
    wherein, generating the plurality of pre-distorted images having different correcting values comprises:
        acquiring a plurality of lookup tables, wherein each of the lookup tables stores coordinates (x, y) of each pixel in the pre-distorted image and coordinates ($x_0$, $y_0$) of a pixel in the reference image corresponding to the coordinates (x, y); and
        traversing all the pixels in the pre-distorted image for each lookup table while replacing a pixel value at coordinate ($x_0$, $y_0$) in the reference image with a pixel value at coordinate (x, y) in the pre-distorted image, to obtain a plurality of pre-distorted images having different correcting values and a correcting value of each of the pre-distorted images,
    wherein, each lookup table corresponds to a distortion correction parameter $k_1$, x is a horizontal ordinate of each pixel in the pre-distorted image to be generated, y is a vertical ordinate of each pixel in the pre-distorted image to be generated, $x_0$ is a horizontal ordinate of each pixel in the reference image, and $y_0$ is a vertical ordinate of each pixel in the reference image;
    wherein, for a barrel distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x_0 = x \cdot (k_1 \cdot r + 1)/(k_1 \cdot r_{max} + 1) \\ y_0 = y \cdot (k_1 \cdot r + 1)/(k_1 \cdot r_{max} + 1) \end{cases}$$
$$r = x^2 + y^2$$
$$r_{max} = (x_{max}^2 + y_{max}^2)/4$$

wherein x ranges from 0 to $x_{max}$, and $x_{max}$ is a maximum value of x, and y ranges from 0 to $y_{max}$, and $y_{max}$ is a maximum value of y; and
    wherein the correcting value of each of the pre-distorted images is a correcting value of a pixel that has the largest correcting value in the pre-distorted image.

2. The method of claim 1, further comprising:
    calculating out coordinates ($x_0$, $y_0$) of pixels in the corresponding reference image based on the correspondence according to the coordinates (x, y) of pixels in the pre-distorted image; and
    performing a bilinear interpolation compensation on the coordinates ($x_0$, $y_0$) of a pixel in the reference image in response to the coordinates ($x_0$, $y_0$) being in a form of floating point numbers.

3. The method of claim 1, wherein,
    for a trapezoidal distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x = \dfrac{x_0}{1 + k_1 y_0} \cdot (1 + k_1 y_{0max}) \\ y = y_0 \end{cases}$$

wherein $y_0$ ranges from 0 to $y_{0max}$, and $y_{0max}$ is the maximum value of $y_0$.

4. The method of claim 3, wherein the correcting value of each of the pre-distorted images is a correcting value of a pixel that has the largest correcting value in the pre-distorted image.

5. The method of claim 3, further comprising,
    calculating out coordinates ($x_0$, $y_0$) of pixels in the corresponding reference image based on the correspondence according to the coordinates (x, y) of pixels in the pre-distorted image; and
    performing a bilinear interpolation compensation on the coordinates ($x_0$, $y_0$) of a pixel in the reference image in response to the coordinates ($x_0$, $y_0$) being in a form of floating point numbers.

6. The method of claim 1, wherein, comparing each of the display images with the reference image, to obtain a display image having a distortion value smaller than a first threshold with respect to the reference image, and determining a correcting value of a pre-distorted image corresponding to this display image as a distortion value of the optical device comprises:

determining a correcting value of the pre-distorted image corresponding to one display image that has a distortion value which is the smallest distortion value among the plurality of display images with respect to the reference image and less than the first threshold, as the distortion value of the optical device.

7. The method of claim 1, wherein, correcting the image distortion of the optical device depending on the distortion value of the optical device comprises:

in response to a distortion value of the optical device that is less than a second threshold, inputting an image to be input into the optical device directly into the optical device;

in response to a distortion value of the optical device that is greater than or equal to the second threshold, applying a pre-distortion to the image to be input into the optical device so as to generate a pre-distorted image and inputting the pre-distorted image into the optical device, wherein a correcting value of the pre-distorted image is equal to the distortion value of the optical device.

8. The method of claim 7, wherein the first threshold is less than or equal to the second threshold.

9. A display device comprising:

an optical device, a memory and a processor;

wherein, the processor is configured to perform a first process for generating a plurality of pre-distorted images having different correcting values based on a same reference image;

the optical device is configured to respectively generate a plurality of display images in one-to-one correspondence to the plurality of pre-distorted images based on the pre-distorted images;

the processor is further configured to perform a second process for comparing each of the display images with the reference image, to obtain a display image having a distortion value smaller than a first threshold with respect to the reference image, and determine a correcting value of a pre-distorted image corresponding to this display image as a distortion value of the optical device, and configured to perform a third process for correcting the image distortion of the optical device depending on the distortion value of the optical device;

the memory is configured to store a plurality of lookup tables, and each of the lookup tables stores coordinates (x, y) of each pixel in the pre-distorted image to be generated and coordinates ($x_0$, $y_0$) of a pixel in the reference image corresponding to the coordinates (x, y) of each pixel in the pre-distorted image to be generated; wherein, each of the lookup tables corresponds to a distortion correction parameter $k_1$ and a correcting value of a corresponding pre-distorted image, x is a horizontal ordinate of each pixel in the pre-distorted image to be generated, y is a vertical ordinate of each pixel in the pre-distorted image to be generated, $x_0$ is a horizontal ordinate of each pixel in the reference image, and $y_0$ is a vertical ordinate of each pixel in the reference image;

the first process is configured to obtain the plurality of lookup tables from the memory and traverse all the pixels in the pre-distorted image for each lookup table while replacing a pixel value at coordinates ($x_0$, $y_0$) of a pixel in the reference image with a pixel value at coordinates (x, y) of a pixel in the pre-distorted image, to obtain a plurality of pre-distorted images having different correcting values and a correcting value of each of the pre-distorted images;

for a barrel distortion that the optical device applies to an input image, a correspondence between the coordinates (x, y) of the pixels in the pre-distorted image to be generated and the coordinates ($x_0$, $y_0$) of the pixels in the reference image is defined as:

$$\begin{cases} x_0 = x \cdot (k_1 \cdot r + 1)/(k_1 \cdot r_{max} + 1) \\ y_0 = y \cdot (k_1 \cdot r + 1)/(k_1 \cdot r_{max} + 1) \end{cases}$$

$$r = x^2 + y^2$$

$$r_{max} = (x_{max}^2 + y_{max}^2)/4$$

wherein x ranges from 0 to $x_{max}$, and $x_{max}$ is a maximum value of x, and y ranges from 0 to $y_{max}$, and $y_{max}$ is a maximum value of y; and the correcting value of each of the pre-distorted images is a correcting value of a pixel that has the largest correcting value in the pre-distorted image.

10. The display device of claim 9, wherein the third process is configured to apply a pre-distortion to an image to be input into the optical device, in response to a distortion value of the optical device that is greater than or equal to a second threshold, to generate a pre-distorted image for display of the optical device, wherein the correcting value of the pre-distorted image is equal to the distortion value of the optical device.

11. The display device of claim 9, wherein for a trapezoidal distortion that the optical device applies to an input image, the correspondence between the coordinates (x, y) of the pixels in the pre-distorted image to be generated and the coordinates ($x_0$, $y_0$) of the pixels in the reference image is defined as:

$$\begin{cases} x = \dfrac{x_0}{1 + k_1 y_0} \cdot (1 + k_1 y_{0max}) \\ y = y_0 \end{cases}$$

wherein $y_0$ ranges from 0 to $y_{0max}$, and $y_{0max}$ is the maximum value of $y_0$.

12. The display device of claim 11, wherein the correcting value of each of the pre-distorted images is a correcting value of a pixel that has the largest correcting value in the pre-distorted image.

13. The display device of claim 11, wherein the second process is configured to determine a correcting value of the pre-distorted image corresponding to one display image that has a distortion value which is the smallest distortion value among the plurality of display images with respect to the reference image and less than the first threshold, as the distortion value of the optical device.

\* \* \* \* \*